United States Patent
Reinhardt et al.

(10) Patent No.: US 10,657,178 B2
(45) Date of Patent: May 19, 2020

(54) PROCESSING OF A GENERATE ENTITY TYPE GRAPH COMPONENT OF A GRAPH ANALYSIS SYSTEM

(71) Applicant: Cray Inc., Seattle, WA (US)

(72) Inventors: Steven Paul Reinhardt, Eagan, MN (US); George Ng, Dublin, CA (US); Michael Andrew Thomson, Salmon Arm (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/466,868

(22) Filed: Aug. 22, 2014

(65) Prior Publication Data

US 2016/0055261 A1 Feb. 25, 2016

(51) Int. Cl.
*G06F 16/248* (2019.01)
*G06F 16/901* (2019.01)

(52) U.S. Cl.
CPC ........ *G06F 16/9024* (2019.01); *G06F 16/248* (2019.01)

(58) Field of Classification Search
CPC .......... G06F 17/30321; G06F 17/3043; G06F 17/30651; G06F 17/30958; G06F 17/30292; G06F 16/248; G06F 16/9024; G06F 3/0418
See application file for complete search history.

(56) References Cited

U.S. PATENT DOCUMENTS

| | | | | |
|---|---|---|---|---|
| 7,549,309 B2* | 6/2009 | Beringer | ........... | G06F 17/30991 345/619 |
| 7,720,857 B2* | 5/2010 | Beringer | ........... | G06F 17/30991 345/676 |
| 8,751,505 B2* | 6/2014 | Carmel | ............. | G06F 17/30604 707/742 |
| 8,977,650 B2* | 3/2015 | Duan | ..................... | G06F 16/211 707/798 |
| 9,195,941 B2* | 11/2015 | Mojsilovic | ............. | G06Q 10/00 |
| 9,292,545 B2* | 3/2016 | Malik | .................. | G06F 17/2785 |
| 2005/0114802 A1* | 5/2005 | Beringer | ........... | G06F 17/30991 715/700 |
| 2008/0243908 A1* | 10/2008 | Aasman | ................... | G06F 16/28 |
| 2009/0027392 A1* | 1/2009 | Jadhav | .............. | G06F 17/30958 345/440 |
| 2011/0252034 A1* | 10/2011 | Padovitz | ........... | G06F 17/30011 707/737 |

(Continued)

OTHER PUBLICATIONS

Al-Saffar, et al., "Structure Discovery in Large Semantic Graphs Using Extant Ontological Scaling and Descriptive Semantics," 2011 IEEE/WIC/ACM International Conferences on Web Intelligence and Intelligent Agent Technology; pp. 211-218; http://hpc.pnnl.gov/people/sinan/publications/al-Saffar_Discovery-WI11.pdf.

*Primary Examiner* — Jean M Corrielus
(74) *Attorney, Agent, or Firm* — Hewlett Packard Enterprise Patent Department

(57) ABSTRACT

A graph analysis system provides a variety of graph analysis tools for analyzing graphs, such as an overall characteristics report, an entity types graph, an ego entity type graph, various histograms, and graph comparison reports. The graph analysis tools also include tools for calculating a similarity score for graphs based on characteristics and weights selected by a user.

5 Claims, 16 Drawing Sheets

(56) References Cited

U.S. PATENT DOCUMENTS

| | | | |
|---|---|---|---|
| 2011/0268364 A1* | 11/2011 | Hido | G06F 17/30958 382/218 |
| 2012/0124478 A1* | 5/2012 | King | G06F 17/30943 715/738 |
| 2012/0215791 A1* | 8/2012 | Malik | G06F 17/30292 707/749 |
| 2013/0238631 A1* | 9/2013 | Carmel | G06F 17/30604 707/742 |
| 2014/0143281 A1* | 5/2014 | Duan | G06F 17/30292 707/798 |
| 2014/0244657 A1* | 8/2014 | Mizell | G06F 17/30321 707/743 |
| 2014/0379755 A1* | 12/2014 | Kuriakose | G06F 17/3043 707/780 |
| 2015/0100568 A1* | 4/2015 | Golden | G06F 17/30651 707/722 |
| 2015/0100605 A1* | 4/2015 | Golden | G06F 17/30958 707/798 |
| 2015/0347480 A1* | 12/2015 | Smart | G06F 17/30327 707/743 |
| 2015/0363476 A1* | 12/2015 | Li | G06F 17/30569 707/714 |
| 2016/0012149 A1* | 1/2016 | Muchinsky | G06F 17/30958 707/749 |
| 2016/0012151 A1* | 1/2016 | Muchinsky | G06F 17/30958 707/748 |
| 2016/0224637 A1* | 8/2016 | Sukumar | G06F 16/2465 |
| 2016/0314126 A1* | 10/2016 | Malik | G06F 17/30292 |
| 2019/0278777 A1* | 9/2019 | Malik | G06F 16/9024 |

\* cited by examiner

300

| Overall Characteristics Report | | ✕ |
|---|---|---|
| 301 — number of entity types | 3 | |
| 302 — number of edges | 32 | |
| 303 — number of edge types | 10 | |
| 304 — N highest degree entity | | |
|     Patient1 | 2 | |
|     Provider1 | 2 | |
| 305 — N most frequent entity types | | |
|     Procedure | 3 | |
|     Patient | 2 | |
|     Provider | 2 | |
| 306 — N most frequent edge types | | |
|     rdf:type | 7 | |
|     umls:location | 5 | |
|     umls:procedure | 3 | |
|     umls:date | 3 | |

*FIG. 3*

Generate Predicate Frequency Histogram   600

610
- ☑ rdf:type      7
- ☑ umls:location   5
- ☑ umls:procedure  3
- ☑ umls:date     3
- ☐ umls:proctype   3
- ☐ umls:location   3
- ☐ umls:provider   3
- ☐ umls:BMI      2
- ☐ umls:DOB      2
- ⋮

( generate )   620

Generate Predicate Subject Frequency Histogram ☒

☐ rdf:type 7
☐ umls:location 5
☑ umls:procedure 3
○
○

☐ umls:DOB
○
○

( generate )

*FIG. 9*

PROCESSING OF A GENERATE ENTITY TYPE GRAPH COMPONENT OF A GRAPH ANALYSIS SYSTEM

BACKGROUND

Data relationships are often modeled as a graph with the vertices of the graph representing entities or non-entities, such as literals, and the edges of the graph representing relationships between the entities or literals. The vertices representing entities are referred to as entity vertices, and the vertices representing non-entities are referred to as literal vertices or non-entity vertices. Each entity vertex has an entity type indicating the type of entity that the entity vertex represents and an entity identifier uniquely identifying that entity vertex, each literal vertex has a value that is a literal, and each edge has an edge type. For example, in the medical field, a graph may have entity vertices representing people, procedures (e.g., appendectomies), hospitals, prescriptions, and so on. If a physician, John Smith, has written 100 prescriptions, then the graph may contain one entity vertex for John Smith with the entity type of person and an entity identifier that is a unique identifier, such as "John Smith" or his Social Security number. The graph also contains one entity vertex for each of the prescriptions with the entity type of prescription and an entity identifier that uniquely identifies the prescription, such as a globally unique Rx number. The graph also contains 100 directed edges with each edge connecting an entity vertex representing a prescription to the entity vertex representing John Smith. Each edge may have the edge type of "prescribed by" to indicate that John Smith prescribed that prescription. The graph may also include a literal vertex with a literal of "Jan. 1, 1964" and include an edge with an edge type of "date of birth" that connects the entity vertex representing John Smith to that literal vertex indication that John Smith's date of birth is Jan. 1, 1964. As another example, in the electronic commerce field, a graph may have entity vertices representing customers, web sites, products, purchases, and so on. If a customer visits a web site, the entity vertex representing that customer may have an edge going to the entity vertex representing that web site with an edge type of "visited."

Data relationships can also be modeled as a property graph with the vertices of the graph representing only entities and with non-entity information stored as attributes or properties of an entity vertex. For example, the entity vertex representing John Smith would have a date of birth property with the value of "Jan. 1, 1964." In the following, the term "graph" encompasses both a property graph and a non-property graph. A non-property graph is a graph that includes non-entity vertices for storing non-entity information. Also, the context surrounding the use of the term "graph" will make it clear whether a non-property graph or a property graph is being described.

Large collections of data can store data for hundreds of different types of entities with hundreds of different types of relationships. These collections can store data for millions of entities. In the medical field example, a collection may store information for 100 million people, 200 million prescriptions, and 500 million office visits, and the number of relationships between the entities may number in the billions. The graph corresponding to these collections may have billions of entity vertices, even more literal vertices, and billions of edges.

Collections of data representing relationships between entities, such as these large collections, may be referred to as instances of semantic data models that allow the relationships to be modeled as "facts." The facts are often represented as triples that have a subject, a predicate, and an object. For example, one triple may have the subject of "John Smith," the predicate of "is-a," and the object of "physician," which may be represented as <John Smith, is-a, physician>.

This triple represents the fact that John Smith is a physician. Another triple may be <John Smith, graduate of, University of Washington> representing the fact that John Smith graduated from the University of Washington. Yet another triple is <John Smith, degree, MD> representing the fact that John Smith has an MD degree. The fact that prescription P1 was prescribed by John Smith may be represented by the following triple:

<P1, prescribed by, John Smith>.

With such a semantic model, the subjects are entities, the predicates are relationships, and the objects are entities or literals representing attributes of entities, referred to as entity objects and literal objects. For example, John Smith and the University of Washington are entities, and "physician" and "MD" are attributes of John Smith. In a graph model of a collection of triples, the graph contains an entity vertex for each entity, a literal vertex for each attribute value, and an edge for each triple. The edge representation of a triple connects the entity vertex corresponding to the subject to the entity vertex or literal vertex corresponding to the object, with the edge having an edge type corresponding to the predicate, Some collections of data may store triples that are from different sources and that correspond to different graphs. For example, one collection may have triples collected from the U.S. Center for Disease Control ("CDC") and from various medical insurance companies. For such a collection, each triple may be part of a quadruple that includes an identifier of the source that represents a separate graph. For example, if the data from Blue Cross and the CDC both contain the following triple <P1, prescribed by, John Smith>, then the collection may contain the following quadruples <CDC. P1, prescribed by, John Smith> and <BC, P1, prescribed by, John Smith>.

The first element in the quadruples identifies the graph of which the corresponding triple is part. The triples for Blue Cross and the triples for the CDC represent separate graphs stored as part of the same collection.

Semantic data models can be used to model the relationships between any pairs of types of entity, such as web pages, people, companies, products, meetings, celestial objects, proteins, purchases, telephone numbers, telephone calls, and so on. One semantic data model, referred to as the Resource Description Framework ("RDF"), has been developed by the World Wide Web Consortium ("W3C") to model web resources, but it can be used to model any type of resource. The triples of a semantic data model may be stored in a semantic database that may include a fact table containing the triples representing the facts.

These large collections of data may contain a wealth of information. Various data mining techniques have been developed to assist in extracting useful information from these large collections. The data mining techniques may use classification and clustering techniques (e.g., Bayesian classification), pattern analysis techniques, and so on. If a researcher "understands" the data of a collection, the researcher could select the appropriate data mining tool to extract useful information, realize that the collection lacks sufficient data and augment the collection, realize that two separate collections are incompatible in some way and try to make them compatible, and so on. But without this "understanding," the researcher is at a disadvantage and may spend significant time and computational resources extracting information that may not be particularly useful.

BRIEF DESCRIPTION OF DRAWINGS

FIG. 3 illustrates a display page that displays an overall characteristics report for the example collection of triples in some embodiments.

FIG. 6 illustrates a display page for selecting predicates to be included in a predicate frequency histogram in some embodiments.

FIG. 9 illustrates a display page for selecting a predicate for a predicate-subject histogram in some embodiments.

DETAILED DESCRIPTION

Figure 1:
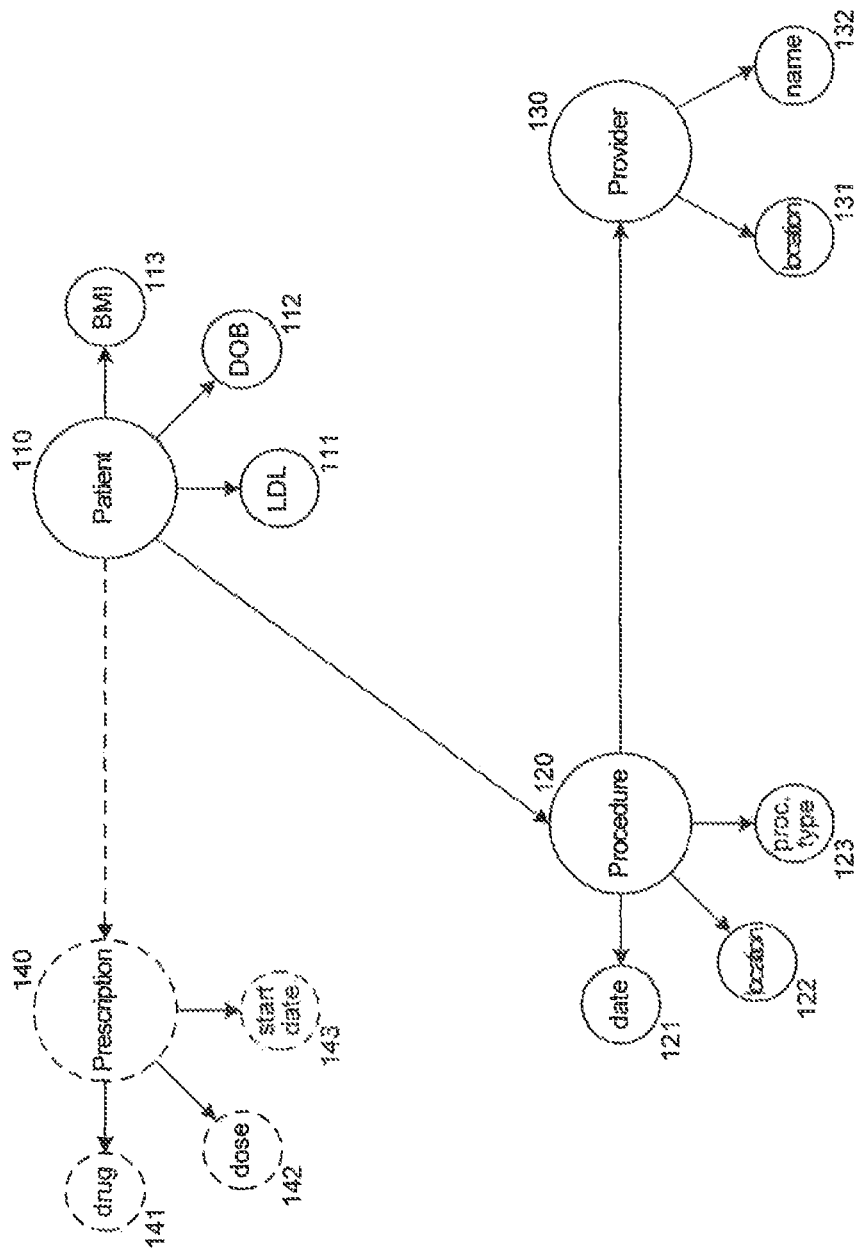
FIG. 1 illustrates a schema diagram that illustrates a schema for an example collection of triples in some embodiments.

Methods and systems for analyzing graphs are provided. In some embodiments, a graph analysis system provides a variety of graph analysis tools for analyzing graphs, such as an overall characteristics report, an entity types graph, an ego entity type graph, various histograms, and graph comparison reports.

An overall characteristics report provides a summary of key characteristics of a graph, such as number of entity vertices, number of entity types, number of edges, number of edge types, the most frequent entity types, and the entity vertices with the highest degrees (individually and summarized by the entity type).

An entity type graph provides a summary of the entity types within a graph and the edges between the entity-type vertices. The entity type graph may include a node representing each entity type. The entity type graph includes a link connecting nodes to represent that the graph contains an edge connecting vertices of the entity types represented by the connected nodes.

An ego entity type graph provides a summary of edges between a selected entity type and other entity types of a graph. The ego entity type graph includes a node representing the selected entity type and nodes representing the entity types to which an entity vertex of the selected entity type is connected. The ego entity type graph also includes links connecting nodes to represent that the graph contains an edge connecting entity vertices of the entity types represented by the connected nodes.

The histograms may summarize various characteristics of a graph, such as frequency of entity types, frequency of edge types, frequency of entity vertices with edges of selected edge types, and so on. The graph comparison reports provide various comparisons between two graphs, such as graph similarity scores based on histogram comparisons, graph characteristics comparisons, and so on.

In some embodiments, the graph analysis system may generate the statistics for use by the graph analysis tool in real-time when a user interacts with the tool. For example, when a user requests to display the overall characteristics report the graph is analyzed to generate the statistics (e.g., number of vertices) for the report. The graph analysis system may also generate the statistic prior to the user interacting with the tool such as periodically or whenever a graph is modified (e.g., new relationships added).

In the following, the graph analysis system is described using an example collection of triples that represents a graph. Table 1 lists some of the triples of the example collection.

TABLE 1

| Subject | Predicate | Object |
|---|---|---|
| Patient1 | rdf:type | umls:patient |
| Patient1 | umls:BMI | 20.3 |
| Patient1 | umls:DOB | Jan. 1, 1950 |
| Patient1 | umls:LDL | 61.8 |
| Patient1 | umls:procedure | Procedure1 |
| Patient1 | umls:procedure | Procedure2 |
| Patient2 | rdf:type | umls:patient |
| Patient2 | umls:BMI | 15.8 |
| Patient2 | umls:DOB | Jul. 4, 1976 |
| Patient2 | umls:LDL | 53.7 |
| Patient2 | umls:procedure | Procedure3 |
| Procedure1 | rdf:type | umls:procedure |
| Procedure1 | umls:date | Jan. 1, 1980 |
| Procedure1 | umls:location | Seattle |
| Procedure1 | umls:proctype | Appendectomy |
| Procedure1 | umls:provider | Provider1 |
| Procedure2 | rdf:type | umls:procedure |
| Procedure2 | umls:date | Dec. 21, 2013 |
| Procedure2 | umls:location | Los Angeles |
| Procedure2 | umls:proctype | Skin Excision |
| Procedure2 | umls:provider | Provider2 |
| Procedure3 | rdf:type | umls:procedure |
| Procedure3 | umls:date | Aug. 8, 1982 |
| Procedure3 | umls:location | Seattle |
| Procedure3 | umls:proctype | Tonsillectomy |
| Procedure3 | umls:provider | Provider1 |
| Provider1 | rdf:type | umls:provider |
| Provider1 | umls:location | Seattle |
| Provider1 | umls:name | UW Medicine |
| Provider2 | rdf:type | umls:provider |
| Provider2 | umls:location | Los Angeles |
| Provider2 | umls:name | Kaiser |

The triples with a predicate of "rdf:type," which are highlighted in the table, define the entity types. For example, the triple <Patient1, rdf.type, umls:patient>
defines that the entity uniquely identified by "Patient1" is of type "umls:patient." The prefix "rdf" indicates that the predicate is defined by the Resource Description Framework, and the prefix "umls" indicates that the object type is defined by the Unified Medical Language System. In this example, the unique identifiers are represented by descriptive names. However, collections of triples typically use globally unique identifiers in the format of uniform resource identifiers ("URIs") as defined by the Internet Engineering Task Force ("IETF") to identify entities.

The example collection of triples represents seven entities: two patients, three procedures, and two providers. The corresponding graph includes an entity vertex for each entity and a literal vertex for each object that is literal. The graph includes a directed edge for each triple with an edge type corresponding to the predicate and connecting the entity vertex corresponding to the subject to the entity or literal vertex corresponding to the object. For example, the graph includes a directed edge connecting the entity vertex for Patient1 to the entity vertex for Procedure1 and a directed edge connecting the entity vertex Procedure1 to the literal vertex for "Appendectomy," as represented by the following triples:

<Patient1, umls:procedure, Procedure1> and
<Procedure1, umls:proctype, Appendectomy>.

FIG. 1 illustrates a schema diagram that illustrates a schema for an example collection of triples in some embodiments. A schema diagram 100 represents the schema for the example collection of triples and may be generated based on the triples in the collection. The schema diagram includes large nodes 110, 120, 130, and 140, each of which corresponds to an entity type defined by the schema. The dashed lines indicate portions of the schema that are not illustrated by the example collection of triples or represented in following diagrams. The schema diagram includes small nodes 111-113, 121-123, 131-132, and 141-143 representing literal objects linked by the corresponding predicates. A directed link outgoing from a large node to another large node indicates that the collection includes a triple with a subject of the entity type of the From node and an entity object of the entity type of the To node. For example, the directed link from node 110 to node 120 indicates that the example collection includes a triple with a subject that is an entity type of patient and an entity object that is an entity type of procedure. A directed link outgoing from a large node to a small node indicates that the collection can include a triple with a subject of the entity type of the From node to a literal object with a predicate represented by the small node. For example, the directed link from node 110 to node 113 indicates that the example collection can include a triple with a subject that is an entity type of patient, a predicate that is umls:BMI, and a literal object.

Figure 2:
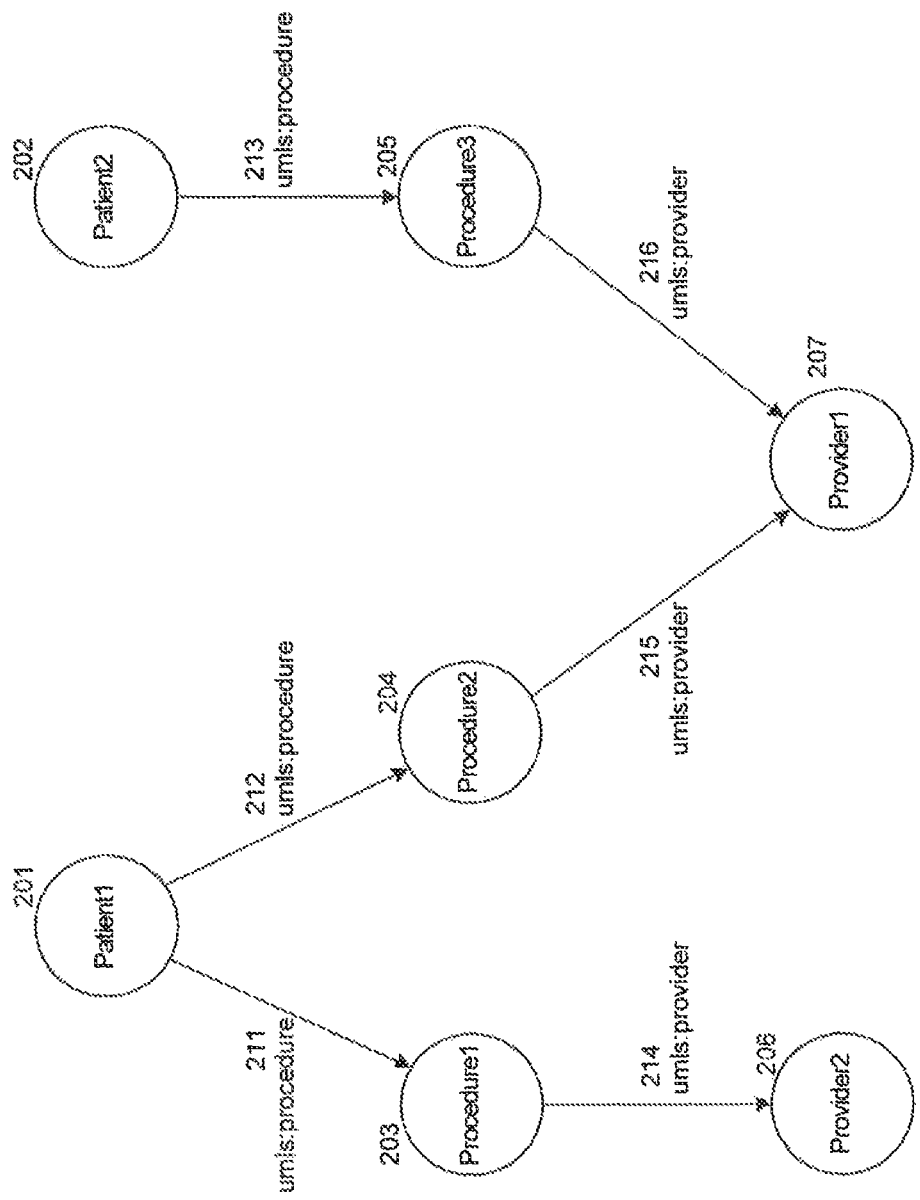
FIG. 2 illustrates an entity graph diagram that illustrates a graph of the entities represented by the example collection of triples in some embodiments.

FIG. 2 illustrates an entity graph diagram that illustrates a graph of the entities represented by the example collection of triples in some embodiments. A graph 200 includes an entity vertex 201-207 for each entity and a directed edge 211-216 for each triple that has an entity object. The edges 211 and 212 from entity vertex 201 to entity vertices 203 and 204, respectively, indicate that the collection of triples includes the following triples:

<Patient1, umls:procedure, Procedure1> and
<Patient1, umls:procedure, Procedure2>.

FIG. 3 illustrates a display page that displays an overall characteristics report for the example collection of triples in some embodiments. The graph analysis system may initially generate statistics for the example collection of triples for use by the various graph analysis tools. The statistics represent the overall characteristics of the graph represented by triples. The display page 300 provides a report for some of these characteristics of the graph represented by the example collection of triples. The characteristic 301 indicates that the graph includes entity vertices for three entity types. The characteristic 302 indicates that the graph includes 32 edges corresponding to the 32 triples. The characteristic 303 indicates that the graph includes 10 edge types corresponding to the 10 distinct predicates. The characteristic 304 indicates the entity vertices of the graph with the highest degrees (i.e., sum of in-degree and out-degree). A characteristic could specify the entity vertices with the highest in-degree and highest out-degree separately. The characteristic 305 indicates the most frequent entity types in the graph. The characteristic 306 indicates the most frequent edge types in the collection of triples.

Figure 4:
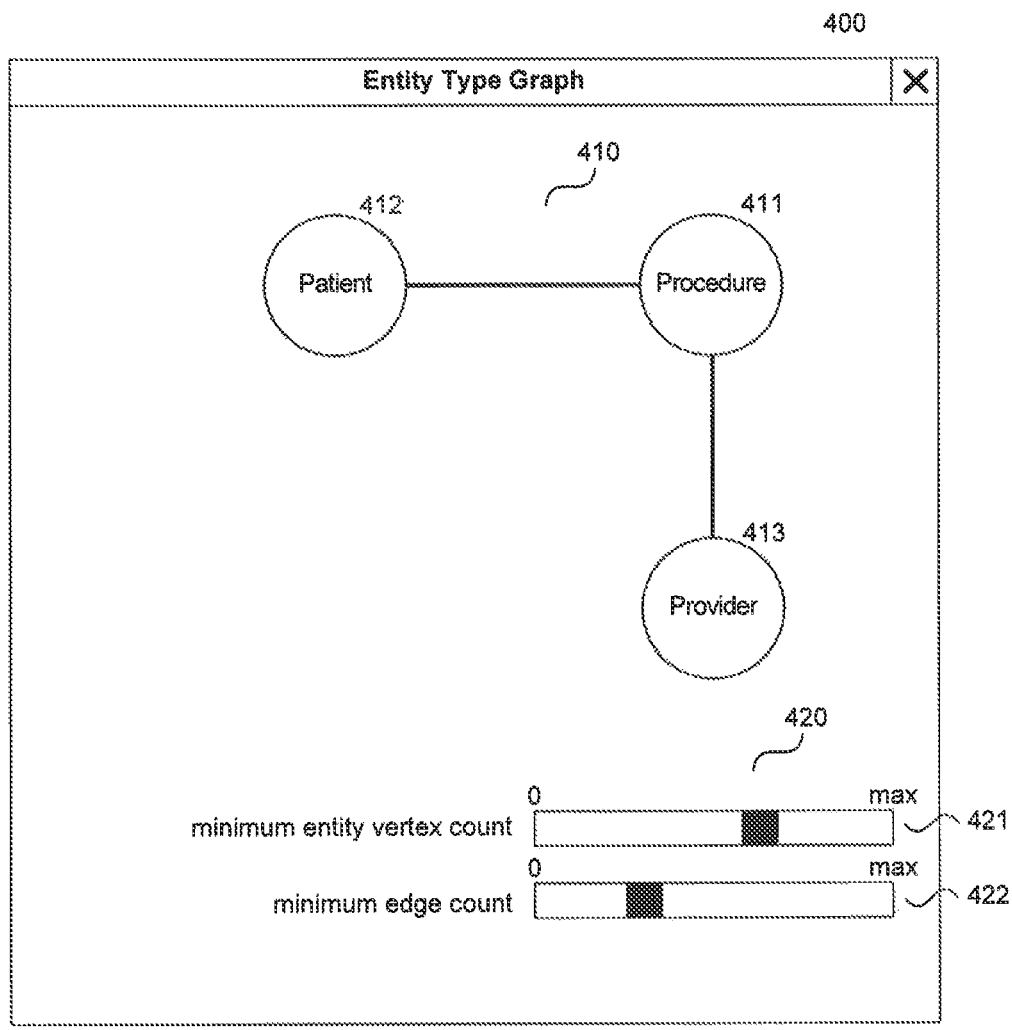
FIG. 4 illustrates a display page that displays an entity type graph in some embodiments.

FIG. 4 illustrates a display page that displays an entity type graph in some embodiments. A display page 400 displays an entity type graph 410 and a filter area 420. The entity type graph provides a summary of the entity types within a graph and the edges between the entity types of the example collection of triples. The entity type graph includes nodes 411-413 corresponding to each of the entity types. The entity type graph includes a link connecting nodes to represent that the graph contains an edge connecting entity vertices of the entity types represented by the connected nodes. The filter area includes sliders 421 and 422 for specifying a filter indicating a minimum count for inclusion in the entity type graph. The slider 421 is used to specify a minimum entity vertex count such that the entity types with less than that count of entity vertices are not included in the entity type graph. The slider 422 is used to specify a minimum edge count such that nodes representing less than that count of edges connecting entity vertices of the entity types represented by the connected nodes are not included in the entity type graph. The size of the nodes in the entity type graph may indicate the relative number of entity vertices of each entity type. The nodes may also include an indication of the actual number of entity vertices of each entity type (e.g., a number within the node). The width of the links in the entity type graph may indicate the relative number of edges between entity vertices of the entity types represented by the connected nodes. The actual number of such edges may also be displayed near each link.

Figure 5:
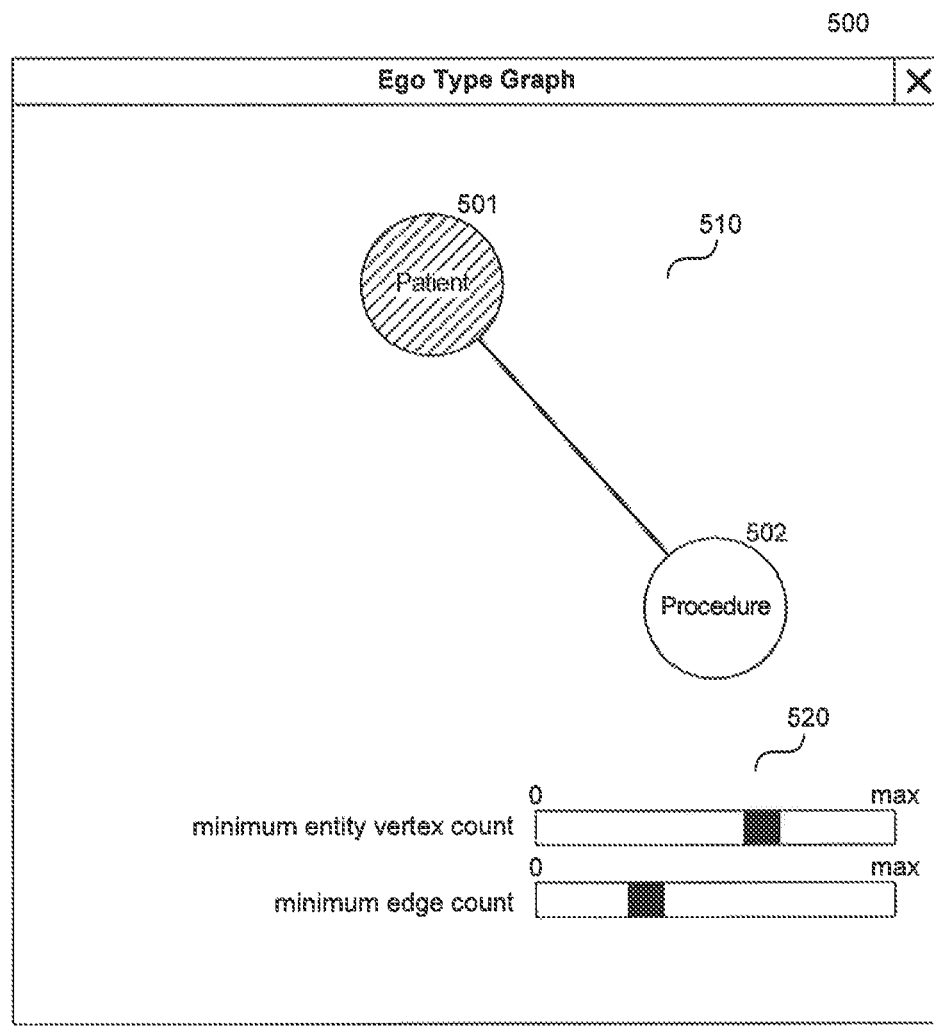
FIG. 5 illustrates a display page that displays an ego entity type graph in some embodiments.

FIG. 5 illustrates a display page that displays an ego entity type graph in some embodiments, A display page 500 includes an ego entity type graph 510 and a filter area 520. The ego entity type graph provides a summary of edges between a selected entity type and other entity types of a graph. The selected entity type for this ego entity type graph is patient. The ego entity type graph includes a node 501 for the selected entity type and a node 502 for each other entity type, which in this example is only one other entity type. The ego entity type graph is similar to the entity type graph except that only the node for the selected entity type and only directly linked nodes are included in the ego entity type graph. The filter area functions in a similar manner as the filter area for the entity type graph. The node for the selected entity type may be highlighted in some way (e.g., shaded or colored) to indicate that it corresponds to the selected entity type. The graph analysis system may also allow the user to specify that nodes other than directly connected nodes are to be included in the ego entity type graph. For example, if the directly connected nodes are considered to be at a distance of one from the node for the selected entity type, then the user may specify that nodes at distances of two or three should also be included in the ego entity type graph. If the specified distance were two, then this ego entity type graph would include a node for the provider entity type.

FIG. 6 illustrates a display page for selecting predicates to be included in a predicate frequency histogram in some embodiments. The predicate frequency histogram or edge type frequency histogram indicates the frequencies of selected predicates. A display page 600 includes a listing 610 of the distinct predicates in the example collection of triples. The listing includes a count of the number of occurrences of that predicate in the example collection along with checkboxes for indicating which predicates are to be included in the histogram. The display page also includes a generate button 620 for indicating that the histogram is to be generated with the currently selected predicates.

Figure 7:
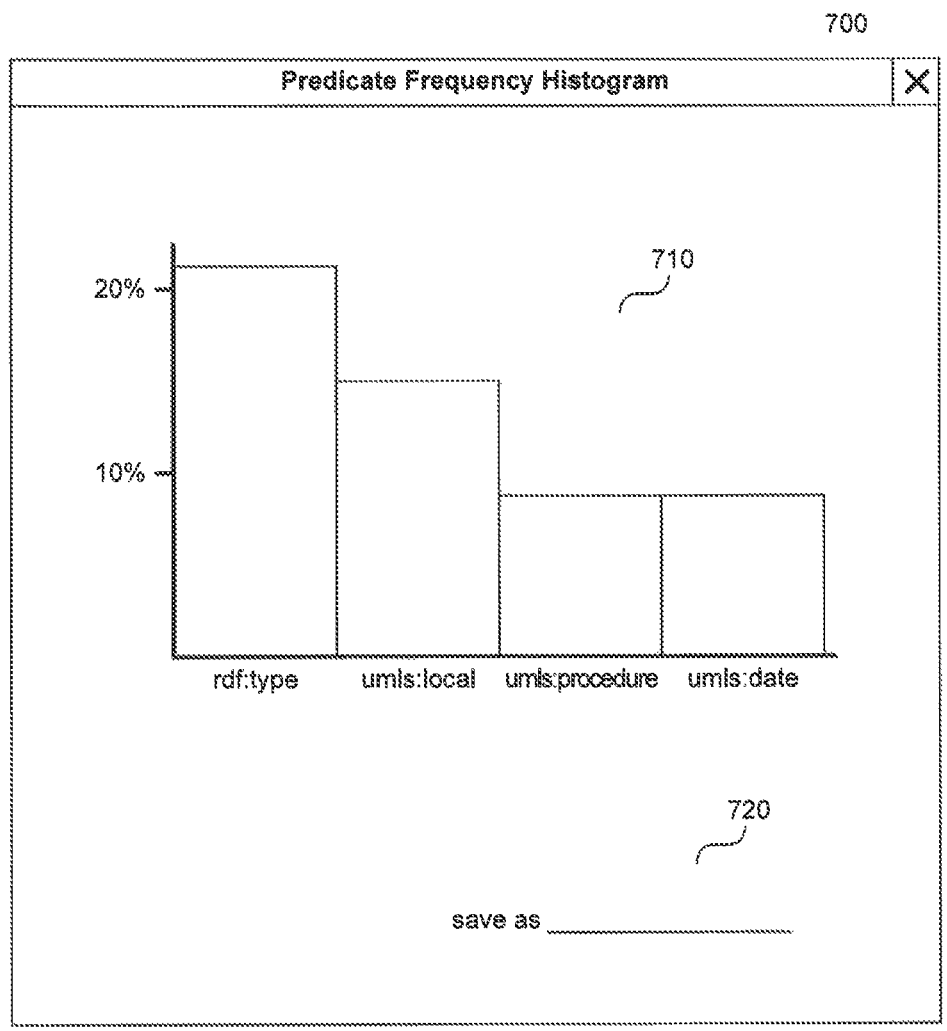
FIG. 7 illustrates a display page for displaying a predicate frequency histogram in some embodiments.

FIG. 7 illustrates a display page for displaying a predicate frequency histogram in some embodiments. A display page 700 displays the predicate frequency histogram 710 for the example collection for the selected predicates of the display page 600. The x-axis represents the selected predicates, and the y-axis represents the percentage of triples in the example collection. The histogram indicates that about 25% of all the triples include the rdf:type predicate. The display page includes a data entry field 720 for indicating a repository name for storing the data for the predicate frequency histogram. The saved data may be used to determine similarity between two collections of triples.

Figure 8:
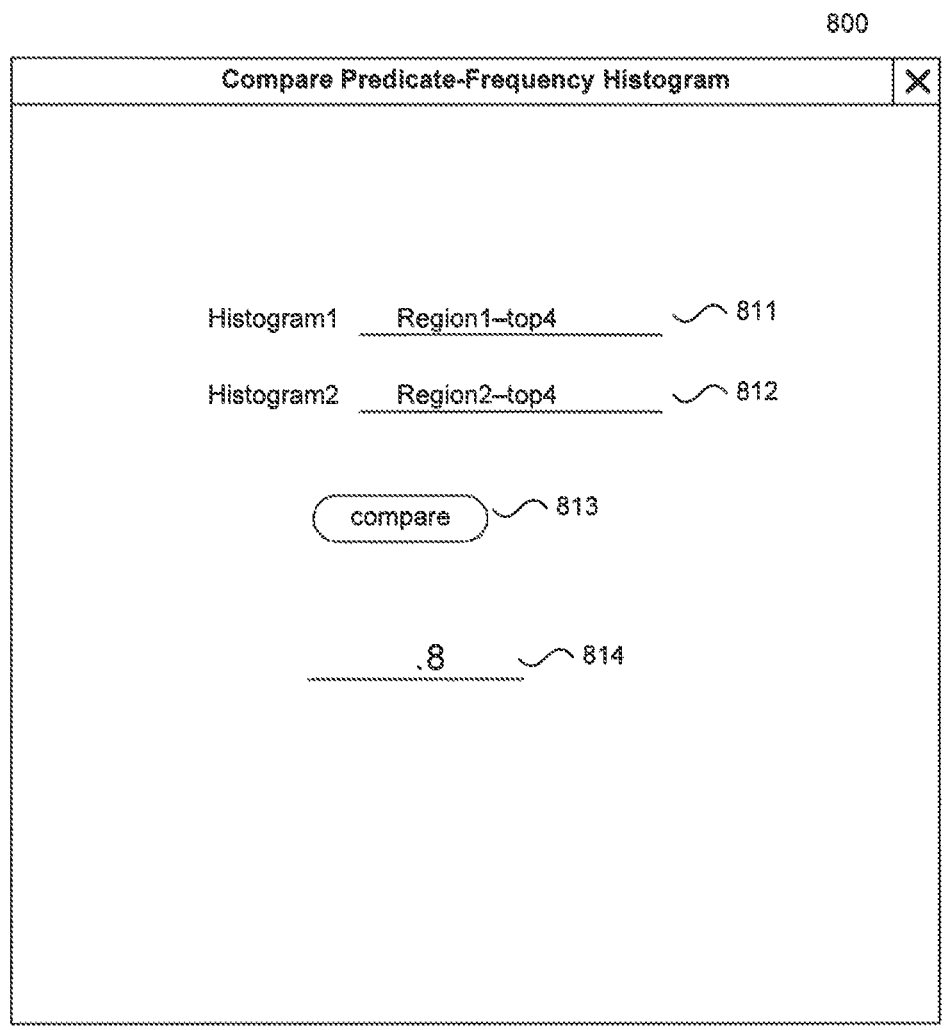
FIG. 8 illustrates a display page for comparing predicate frequency histograms for two collections of triples in some embodiments.

FIG. 8 illustrates a display page for comparing predicate frequency histograms for two collections of triples in some embodiments. A display page 800 includes histogram repository name fields 811 and 812 for entering the names of histograms to be compared. In this example, the repository names of the histograms are "region1-top4" and "region2-top4." The display page includes a compare button 813 for indicating that the comparison between the histograms is to be performed. The display page also includes output field 814 for indicating the similarity between the histograms. Similarity may be a score between 0.0 and 1.0. The similarity score may be a Jaccard-based similarity score, a Kolmogorov-Smirnov-based score, or another similarity score.

FIG. 9 illustrates a display page for selecting a predicate for a predicate-subject frequency histogram in some embodiments. The predicate-subject (or edge-entity type) frequency histogram indicates the frequencies of the entity type of subjects in triples with the selected predicate. A display page 900 is similar to the display page 600. A user may select one or more predicates.

Figure 10:
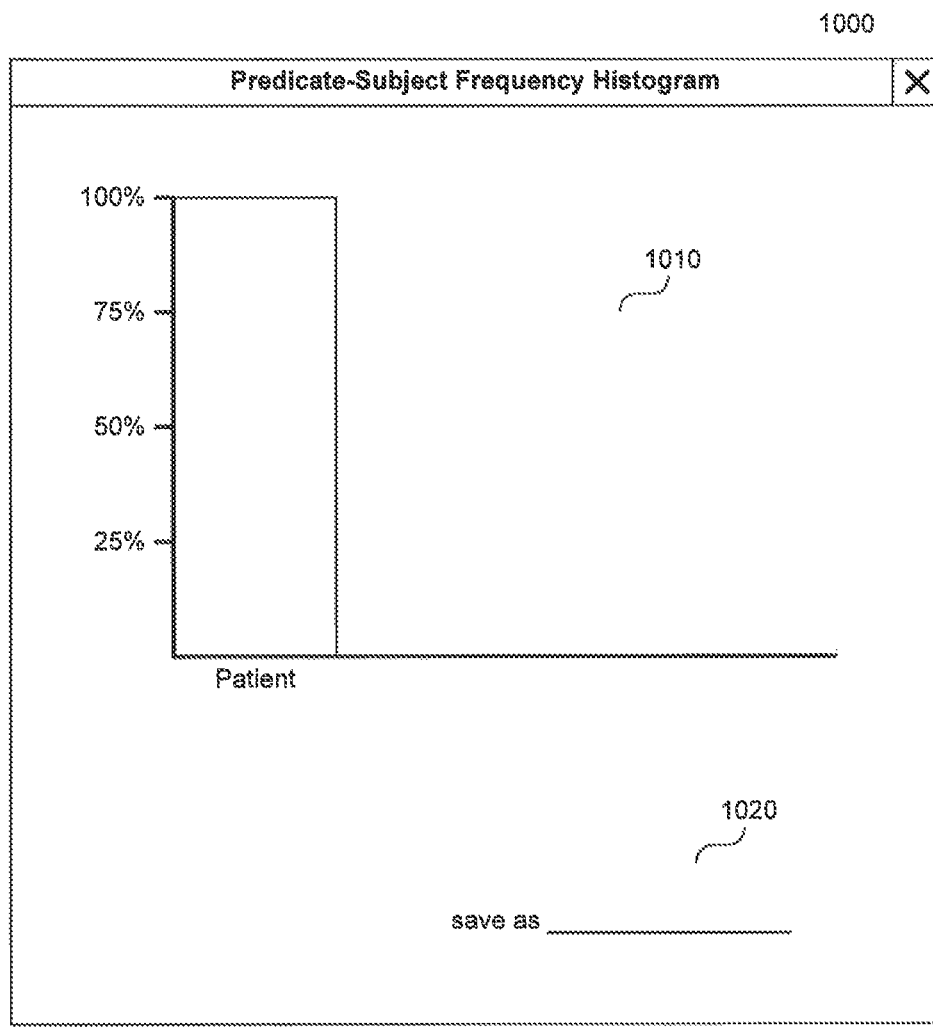
FIG. 10 illustrates a display page for displaying a predicate-subject histogram in some embodiments.

FIG. 10 illustrates a display page for displaying a predicate-subject frequency histogram in some embodiments, A display page 1000 displays the predicate-subject frequency histogram 1010 for the example collection of triples and for the selected predicate of the display page 900. The x-axis represents each entity type in a triple with the selected predicate, and the y-axis represents the percentage of the number of triples with the selected predicate in the example collection. For example, the histogram indicates that 100% of the triples with the umls:procedure predicate have subjects with the entity type of patient. The display page includes a data entry field 1020 for indicating a repository name for storing the data for the predicate-subject frequency histogram. The saved data may be used to determine similarity between two collections of triples.

Figure 11:
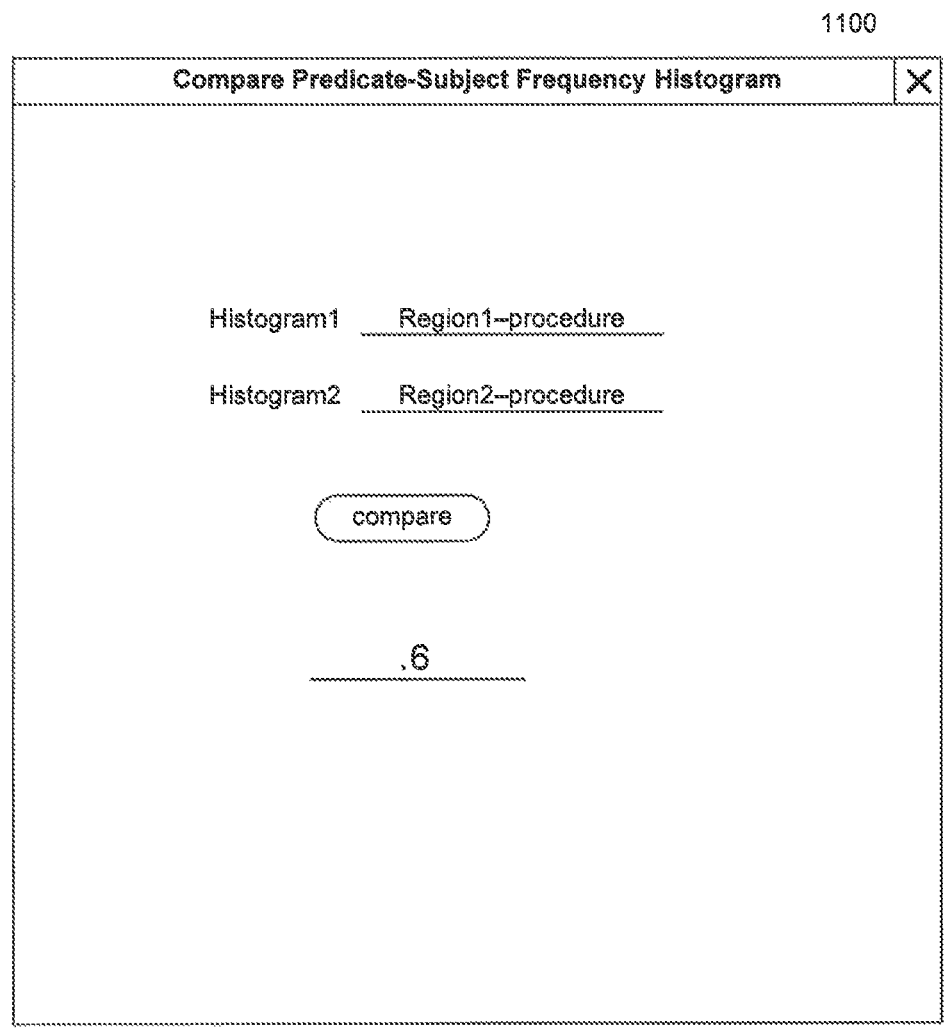
FIG. 11 illustrates a display page for comparing predicate-subject histograms for two collections of triples in some embodiments.

FIG. 11 illustrates a display page for comparing predicate-subject frequency histograms for two collections of triples in some embodiments. A display page 1100 is similar to display page 800. The similarity score may be a Jaccard-based similarity score, a Kolmogorov-Smirnov-based score, and another similarity score.

Figure 12:
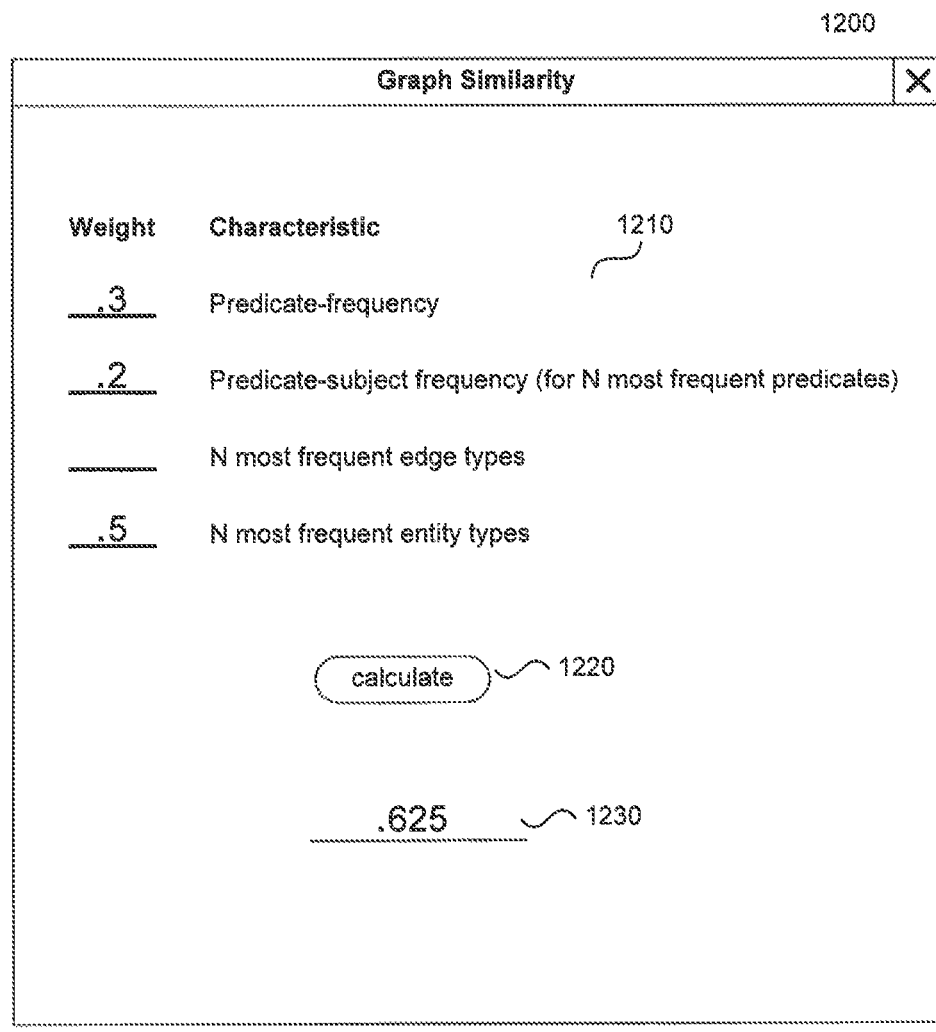
FIG. 12 illustrates a display page for determining similarity between two collections of triples based on multiple characteristics in some embodiments.

FIG. 12 illustrates a display page for determining similarity between two collections of triples based on multiple characteristics in some embodiments. The similarity may be based on comparison of various characteristics of the triples such as their predicate frequency histogram, predicate-subject frequency histogram with a selected predicate, most frequent entity types, and so on. A display page 1200 includes a characteristics list 1210 that includes an entry for example characteristics that can be used to generate a similarity score. Each entry includes a weight field, A user enters the weight to be given each characteristic when generating the similarity score. In this example, the user has entered a weight of 0.3 for the predicate frequency histogram to indicate that the predicate frequency histogram contributes 30% to similarity score. If the score for the predicate frequency histogram is 0.8 as illustrated by the display page 800, then the predicate frequency histogram will contribute 0.24 to the similarity score. The display page includes a calculate button 1220 for calculating the similarity based on the weights and a similarity field 1230 that displays the similarity score. The graph analysis system may allow a user to install components for calculating scores for custom characteristics. For example, a custom characteristic may be a histogram for entities with certain attributes, such as a histogram of the providers that provide a certain type of procedure.

Figure 13:
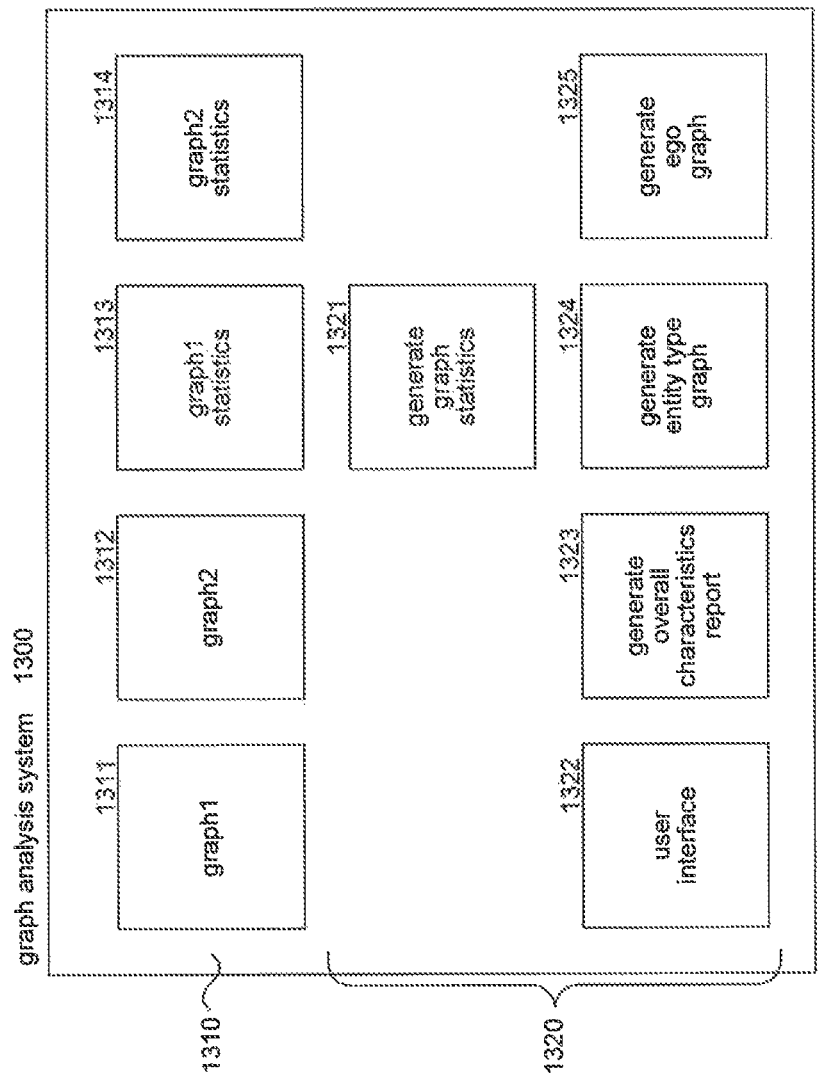
FIG. 13 is a block diagram that illustrates components of the graph analysis system in some embodiments.

FIG. 13 is a block diagram that illustrates components of the graph analysis system in some embodiments, A graph analysis system 1300 includes data repositories 1310 and components 1320. The data repositories include a graph repository 1311 storing a first collection of triples, a graph repository 1312 storing a second collection of triples, a graph statistics repository 1313 storing statistics for the first collection of triples, and a graph statistics repository 1314 storing statistics for the second collection of triples. The components include a generate graph statistics component 1321, a user interface component 1322, a generate overall characteristics report component 1323, a generate entity type graph component 1324, a generate ego graph component 1325, and other components for generating histograms and calculating similarity scores as discussed above but not illustrated in FIG. 13. The generate graph statistics component generates statistics for various characteristics of a graph and stores the statistics in the corresponding graph statistics repository. The user interface component provides the display pages of the graph analysis system. The generate overall characteristics report component generates the overall characteristics report. The generate entity type graph component generates an entity type graph for a graph. The generate ego graph component generates an ego graph for a graph. In some embodiments, the collections of triples may reside in the memory of a single computer or may reside in the memories of computers that form a cluster of computers. Also, the generate graphic statistics component may execute in parallel on computers of the cluster.

The computing devices and systems on which the graph analysis system may be implemented may include a central processing unit, input devices, output devices (e.g., display devices and speakers), storage devices (e.g., memory and disk drives), network interfaces, graphics processing units, and so on. The input devices may include keyboards, pointing devices, touchscreens, gesture recognition devices (e.g., for air gestures), microphones for voice recognition, and so on. The computing devices may include desktop computers, servers, and other computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the graph analysis system. The data transmission media is used for transmitting data via transitory, propagating signals or carrier waves (e.g., electromagnetism) via a wired or wireless connection.

The graph analysis system may be described in the general context of computer-executable instructions, such as program modules and components, executed by one or more computers, processors, or other devices, Generally, program modules or components include routines, programs, objects, data structures, and so on that perform particular tasks or implement particular data types. Typically, the functionality of the program modules may be combined or distributed as desired in various embodiments. Aspects of the graph analysis system may be implemented in hardware using, for example, an application-specific integrated circuit ("ASIC") or field-programmable gate arrays ("FPGAs").

Figure 14:
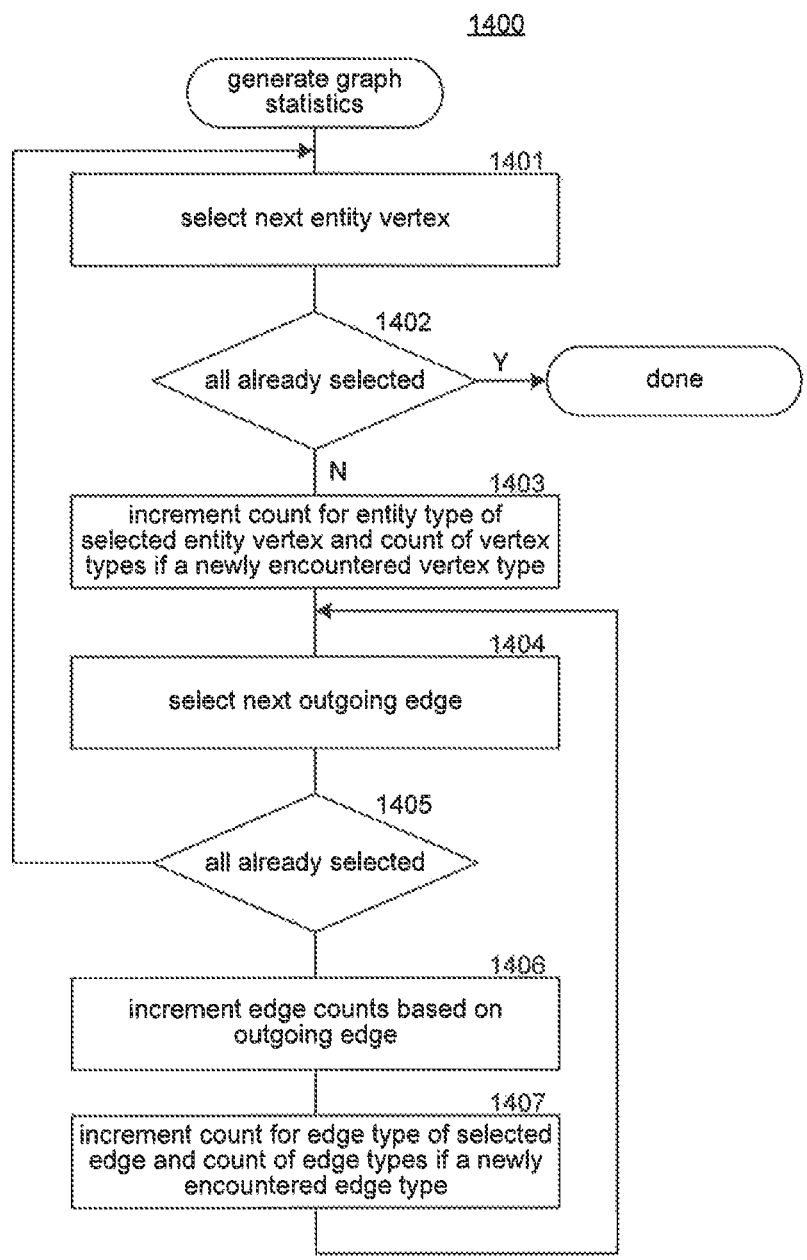
FIG. 14 is a flow diagram that illustrates the processing of a generate-graph-statistics component of the graph analysis system in some embodiments.

FIG. 14 is a flow diagram that illustrates the processing of a generate graph statistics component of the graph analysis system in some embodiments. A component 1400 loops selecting each entity vertex in the graph and generating statistics associated with that entity vertex. In block 1401, the component selects the next entity vertex. In decision block 1402, if all the entity vertices have already been selected, then the component completes, else the component continues at block 1403. In block 1403, the component increments the count for the entity type associated with the selected entity vertex. If the entity type is a newly encountered entity type, the component increments a count of entity types. In blocks 1404-1407, the component loops selecting each outgoing edge of the selected entity vertex and generating statistics based on that outgoing edge. In block 1404, the component selects the next outgoing edge of the selected entity vertex. Each triple with the entity of the selected entity vertex as its subject corresponds to an outgoing edge. In decision block 1405, if all the outgoing edges have already been selected, then the component loops to block 1401 to select the next entity vertex, else the component continues at block 1406. In block 1406, the component increments edge counts based on the outgoing edge. The component increments an outgoing edge count of the selected entity vertex and a count of the total number of edges. If the outgoing edge connects to an entity vertex, then the component increments the incoming edge count of that entity vertex. In block 1407, the component increments an edge type count for the edge type of the selected outgoing edge and then loops to block 1404 to select the next outgoing edge. If the edge type is newly encountered, then the component increments a count of edge types. Alternatively, the component may separately collect all the edges and group the edges, the vertices and group the vertices, and the types and group the types, rather than looping through the entity vertices and their outgoing edges.

Figure 15:
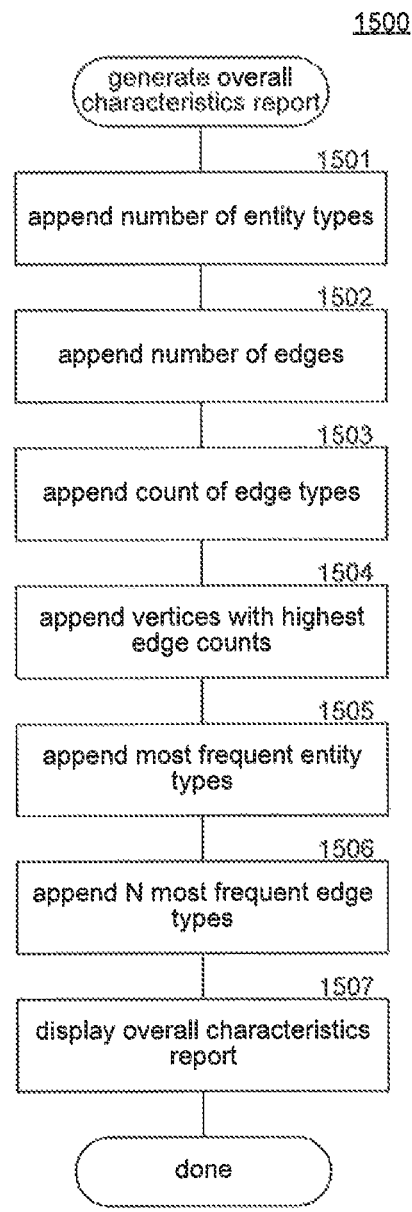
FIG. 15 is a flow diagram that illustrates the processing of a generate overall characteristics report component of the graph analysis system in some embodiments.

FIG. 15 is a flow diagram that illustrates the processing of a generate overall characteristics report component of the graph analysis system in some embodiments. A component 1500 generates an overall characteristics report for a graph using statistics generated for the graph. In block 1501, the component appends the number of entity types to the report. In block 1502, the component appends the number of edges to the report. In block 1503, the component appends a count of the edge types to the report. In block 1504, the component appends an indication of the entity vertices with the highest edge counts to the report. In block 1505, the component appends an indication of the most frequent entity types to the report. In block 1506, the component appends an indication of the most frequent edges to the report. In block 1507, the component displays the overall characteristics report and then completes.

Figure 16:
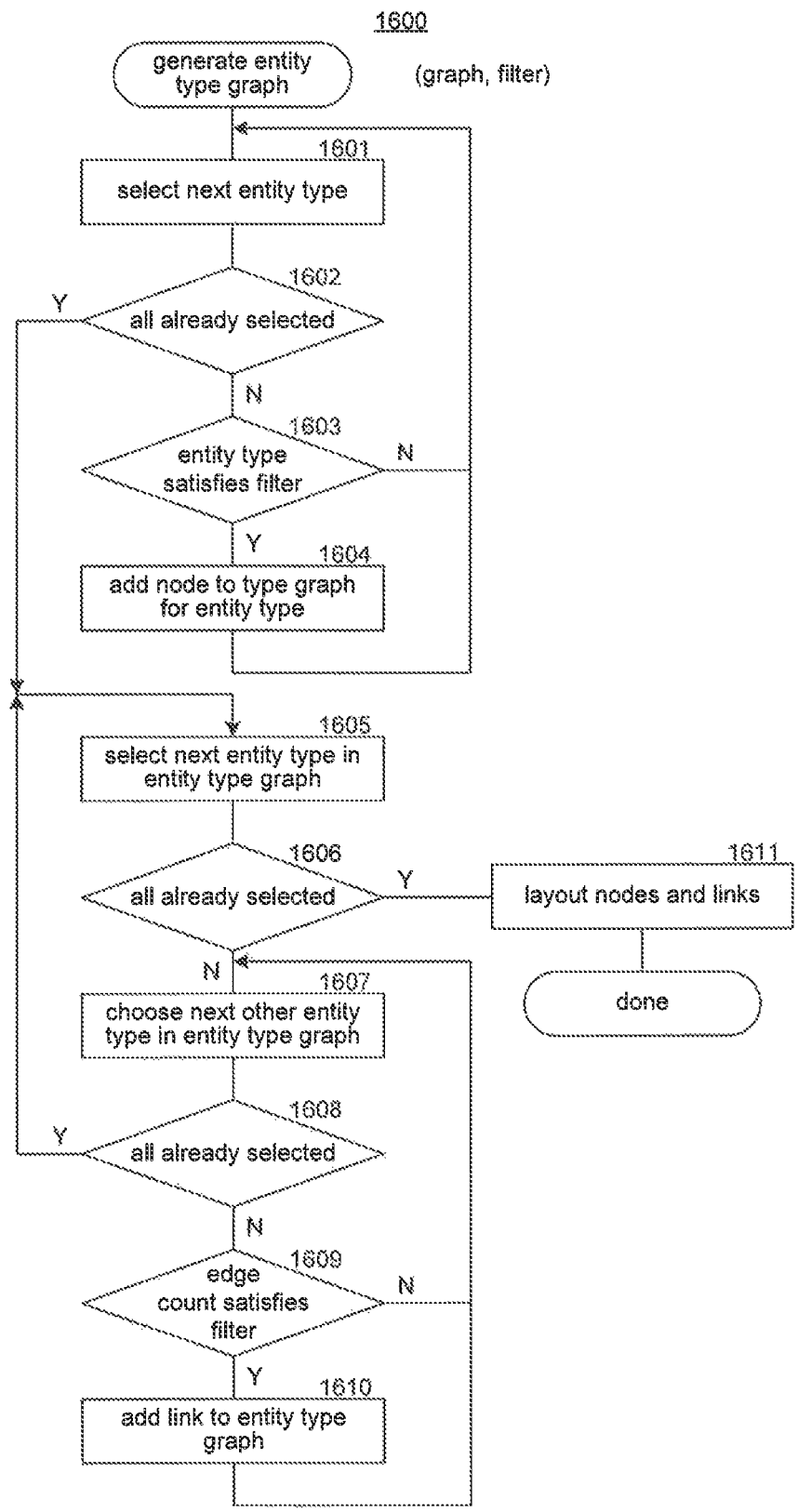
FIG. 16 is a flow diagram that illustrates the processing of a generate entity type graph component of the graph analysis system in some embodiments.

FIG. 16 is a flow diagram that illustrates the processing of a generate entity type graph component of the graph analysis system in some embodiments. A component 1600 generates an entity type graph using statistics generated for a graph. In blocks 1601-1604, the component loops selecting each entity type of the graph and determining whether a node for that entity type should be added to the entity type graph. In block 1601, the component selects the next entity type. In decision block 1602, if all the entity types have already been selected, then the component continues at block 1605, else the component continues at block 1603, In decision block 1603, if the selected entity type satisfies the filter, then the component continues at block 1604, else the component loops to block 1601 to select the next entity type. In block 1604, the component adds a node corresponding to the selected entity type to the entity type graph and then loops to block 1601 to select the next entity type. In blocks 1605-1608, the component loops selecting each entity type that has a node in the entity type graph and adding links associated with that node to the entity type graph. In block 1605, the component selects the next entity type with a node in the entity type graph. In decision block 1606, if all the other such entity types have already been selected, then the component continues at block 1611, else the component continues at block 1607. In block 1611, the component lays out the nodes and links using any of a variety of well-known graph layout techniques, displays the entity type graph, and completes. In blocks 1607-1610, the component loops choosing each other entity type with a node in the entity type graph and adding links corresponding to edges that satisfy a filter. In block 1607, the component chooses the next other entity type with a node in the entity type graph. In decision block 1608, if all other such entity types have already been selected, then the component loops to block 1605 to select the next such entity type, else the component continues at block 1609. In decision block 1609, if the edges between the selected entity type and the chosen other entity type satisfy the filter, then the component continues at block 1610, else the component loops to block 1607 to select the next other such entity type. In block 1610, the component adds a link to the entity type graph connecting the node corresponding to the selected entity type to the node corresponding to the chosen other entity type. Although not illustrated by a figure, the generate ego graph component may function in a similar manner as the generate entity type graph component except with a filter that specifies that nodes are added to the ego graph only for the selected entity type and an entity type that are at a distance of one from the selected entity type.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the graph analysis system may generate a schema graph from a collection of triples and display that schema graph to a user. Such a schema graph may also be considered a characteristic of a graph that can be used when determining similarity between graphs. Accordingly, the invention is not limited except as by the appended claims.

The invention claimed is:

1. A computer-readable storage medium storing computer-executable instructions for controlling a computing device to provide a graphical user interface for analyzing an entity graph having vertices and edges, at least some of the vertices being entity vertices representing an entity of an entity type, each entity having an entity identifier, each edge having an edge type, the instructions comprising:
   a generate overall characteristics report component that
      receives from a user a selection of one or more characteristics relating to the entity graph;
      generates an overall characteristics report for the entity graph that includes the selected characteristics; and
      presents the overall characteristics report to the user; and
   a generate entity type graph component that
      receives from a user a specification of a node filter and a link filter;
      generates an entity type graph for the entity graph, the entity type graph having nodes and links, each node representing an entity type and satisfying the node filter, each link connecting nodes to indicate that the entity graph includes one or more edges connecting entity vertices with the entity types of the connected nodes and satisfying the link filter; and
      presents the entity type graph to the user.

2. The computer-readable storage medium of claim 1 wherein the size of a node in the entity type graph is dependent on the number of entity vertices in the entity graph with the entity type of that node.

3. The computer-readable storage medium of claim 1 wherein the width of a link in the entity type graph is dependent on the number of edges in the entity graph that connect vertices with the entity types of the nodes connected by the link.

4. A method performed by a computer system for providing a graphical user interface for analyzing an entity graph having vertices and edges, at least some of the vertices being entity vertices representing an entity of an entity type, each entity having an entity identifier, each edge having an edge type, the method comprising:
   receiving from a user a specification of a node filter and a link filter;
   generating an entity type graph for the entity graph, the entity type graph having nodes and links, each node representing an entity type and satisfying the node filter, each link connecting nodes to indicate that the entity graph includes one or more edges connecting entity vertices with the entity types of the connected nodes and satisfying the link filter; and
   presenting the entity type graph to the user.

5. A computing device for generating an entity type graph, the computing device comprising:
   a computer-readable storage medium storing computer-executable instructions for controlling the computing device to:
      access an entity graph having vertices and edges, at least some of the vertices being entity vertices representing an entity of an entity type, each edge having an edge type;
      access a specification of a node filter and a link filter;
      for each entity type of an entity of the entity graph that satisfies the node filter, add a node to the entity type graph; and
      for at least some of the pairs of nodes of the entity type graph, add to the entity type graph a link connecting the nodes of the pair when the entity graph includes one or more edges connecting entity vertices with the entity types of the connected nodes and satisfying the link filter; and
   a processor for executing the computer-executable instruction stored in the computer-readable storage medium.

\* \* \* \* \*